(12) United States Patent
Schardt et al.

(10) Patent No.: US 12,092,838 B2
(45) Date of Patent: *Sep. 17, 2024

(54) POLARIZATION BEAM SPLITTER AND HOT MIRROR FOR HEADS UP DISPLAY

(71) Applicant: 3M INNOVATIVE PROPERTIES COMPANY, St. Paul, MN (US)

(72) Inventors: Craig R. Schardt, Woodbury, MN (US); Adam D. Haag, Woodbury, MN (US); Stephen J. Willet, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,934

(22) Filed: Jul. 12, 2023

(65) Prior Publication Data

US 2023/0350217 A1   Nov. 2, 2023

Related U.S. Application Data

(62) Division of application No. 17/795,065, filed as application No. PCT/IB2021/050641 on Jan. 27, 2021, now Pat. No. 11,740,480.

(Continued)

(51) Int. Cl.
*G02B 27/10* (2006.01)
*G02B 5/28* (2006.01)
*G02B 27/01* (2006.01)

(52) U.S. Cl.
CPC ......... *G02B 27/1013* (2013.01); *G02B 5/282* (2013.01); *G02B 27/0101* (2013.01); *G02B 2027/0145* (2013.01)

(58) Field of Classification Search
CPC ............... G02B 27/1013; G02B 5/282; G02B 27/0101; G02B 2027/0145; G02B 5/208;
(Continued)

(56) References Cited

U.S. PATENT DOCUMENTS

2013/0279016 A1   10/2013   Finger
2016/0266389 A1   9/2016   Ouderkirk
(Continued)

FOREIGN PATENT DOCUMENTS

WO   2015122491 A1   8/2015
WO   2018163009 A1   9/2018
(Continued)

OTHER PUBLICATIONS

International Search report for PCT International Application PCT/IB2021/050641, mailed on May 6, 2021, 7 pages.

*Primary Examiner* — Jennifer D. Carruth
(74) *Attorney, Agent, or Firm* — Jonathan L. Tolstedt (57) ABSTRACT

An optical system for displaying a virtual image to a viewer includes stacked integral first reflective polarizer and integral second reflective polarizer, a display, and a mirror. For substantially normally incident light: for at least one visible wavelength in a first wavelength range, the first reflective polarizer reflects at least 60% of the incident light having a first polarization state and transmits at least 60% of the incident light having an orthogonal second polarization state, and the second reflective polarizer transmits at least 60% of the incident light for each of the first and second polarization states; and for at least one infrared wavelength in a second wavelength range, the first reflective polarizer reflects at least 60% of the incident light having the first polarization state and transmits at least 60% of the incident light having the second polarization state, and the second reflective polarizer reflects at least 60% of the incident light (Continued)

having the second polarization state and transmits at least 20% of the light having the first polarization state.

6 Claims, 8 Drawing Sheets

Related U.S. Application Data

(60) Provisional application No. 62/968,240, filed on Jan. 31, 2020.

(58) Field of Classification Search
CPC .... G02B 5/3041; G02B 5/305; G02B 5/3083; G02B 27/283
See application file for complete search history.

(56) References Cited

U.S. PATENT DOCUMENTS

| | | |
|---|---|---|
| 2017/0050564 A1 | 2/2017 | Lv et al. |
| 2020/0073038 A1 | 3/2020 | Weber et al. |
| 2022/0057632 A1 | 2/2022 | Yun et al. |
| 2022/0197024 A1 | 6/2022 | Yun et al. |
| 2022/0299692 A1* | 9/2022 | Xu .................. G02B 5/3041 |
| 2023/0350119 A1* | 11/2023 | Fujita .................. G02B 5/305 |

FOREIGN PATENT DOCUMENTS

| | | |
|---|---|---|
| WO | 2019025923 A1 | 2/2019 |
| WO | 2019077547 A1 | 4/2019 |
| WO | 2019123141 A1 | 6/2019 |

\* cited by examiner

POLARIZATION BEAM SPLITTER AND HOT MIRROR FOR HEADS UP DISPLAY

SUMMARY

In some aspects of the present description, an optical system for displaying a virtual image to a viewer is provided, including stacked integral first reflective polarizer and integral second reflective polarizer, a display, and a mirror. The stacked integral first reflective polarizer and integral second reflective polarizer are such that, for substantially normally incident light: for at least one visible wavelength in a first wavelength range extending from about 450 nm to about 680 nm, the first reflective polarizer reflects at least 60% of the incident light having a first polarization state and transmits at least 60% of the incident light having an orthogonal second polarization state, and the second reflective polarizer transmits at least 60% of the incident light for each of the first and second polarization states; and for at least one infrared wavelength in a second wavelength range extending from about 900 nm to about 1150 nm, the first reflective polarizer reflects at least 60% of the incident light having the first polarization state and transmits at least 60% of the incident light having the second polarization state, and the second reflective polarizer reflects at least 60% of the incident light having the second polarization state and transmits at least 20% of the light having the first polarization state. The display and mirror are disposed on a same side of, and generally facing, the stacked first and second reflective polarizers, such that for substantially normally incident light and for the at least one visible wavelength, the mirror reflects at least 80% of the incident light for each of the first and second polarization states, and such that when an image is emitted by the display, the optical system displays a virtual image of the emitted image, after the emitted image is at least once reflected by the stacked first and second reflective polarizers, for viewing by a viewer.

In some aspects of the present description, an optical film is provided, including an integral first optical stack disposed on an integral second optical stack, each integral optical stack including a plurality of polymeric interference layers reflecting and transmitting light primarily by optical interference for at least one visible wavelength in a first wavelength range extending from about 450 nm to about 680 nm, and at least one infrared wavelength in a second wavelength range extending from about 900 nm to about 1150 nm, such that for substantially normally incident light: for the at least one visible wavelength, the integral first optical stack reflects at least 70% of the incident light having a first polarization state and transmits at least 70% of the incident light having an orthogonal second polarization state, and the second optical stack transmits at least 70% of the incident light for each of the first and second polarization states; and for the at least one infrared wavelength, the second optical stack reflects at least 60% of the incident light having the first polarization state and transmits at least 60% of the incident light having the second polarization state.

In some aspects of the present description, a heads-up display for displaying a virtual image to a passenger of a vehicle is provided, including an exit surface through which an image substantially polarized along a first direction exits the heads-up display and a glare trap. The exit surface is configured to be disposed at or near a dashboard of the vehicle. The glare trap is disposed at the exit surface and configured to reflect at least a portion of ambient light. The glare trap may include a plurality of polymeric interference layers reflecting and transmitting light primarily by optical interference for at least one wavelength in a visible wavelength range extending from about 450 nm to about 680 nm and for at least one wavelength in an infrared wavelength range extending from about 900 nm to about 1150 nm, such that for substantially normally incident light: for the at least one wavelength in the visible wavelength range, the glare trap transmits at least 70% of the incident light having a first polarization state and reflects at least 70% of the incident light having an orthogonal second polarization state; and for the at least one wavelength in the infrared wavelength range, the glare trap reflects at least 60% of the incident light for each of the first and second polarization states.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, an optical system for displaying a virtual image to a viewer (e.g., a heads-up display in a vehicle) includes stacked integral first reflective polarizer and integral second reflective polarizer, a display, and a mirror. In some embodiments, the display may be a light emitting diode (LED) display, liquid crystal display (LCD), an organic light emitting display (OLED), a digital light processing (DLP) display, an electroluminescent (EL) display, or any other appropriate picture generating unit.

The stacked integral first reflective polarizer and integral second reflective polarizer are such that, for substantially normally incident light, and for at least one visible wavelength in a first wavelength range (e.g., human-visible light) extending from about 450 nm to about 680 nm, the first reflective polarizer may reflect at least 60%, or at least 65%, or at least 70%, or at least 80%, of the incident light having a first polarization state and may transmit at least 60%, or at least 65%, or at least 70%, or at least 80%, of the incident light having an orthogonal second polarization state, and the second reflective polarizer may transmit at least 60%, or at least 65%, or at least 70%, or at least 80%, of the incident light for each of the first and second polarization states. In some embodiments, the at least one visible wavelength may include one or more of a blue wavelength, a green wavelength, and a red wavelength.

For the purposes of this disclosure, the first and second polarization types may be any two orthogonal polarization states. For example, in some embodiments, the first and second polarization states may be two orthogonal, linear polarization types, such as p-pol and s-pol linear polarization types. In some embodiments, the first and second polarization states may be two different circular polarization types (that is, circular polarization types of opposite direction or "handedness"). Other polarization states may be used in alternate embodiments, or the types of the first and second polarization types may be swapped depending on the embodiment.

In some embodiments, for at least one infrared wavelength in a second wavelength range extending from about 900 nm to about 1150 nm (e.g., infrared light), the first reflective polarizer may reflect at least 60%, or at least 65%, or at least 70%, or at least 80%, of the incident light having the first polarization state and may transmit at least 60%, or at least 65%, or at least 70%, or at least 80%, of the incident light having the second polarization state, and the second reflective polarizer may reflect at least 60%, or at least 65%, or at least 70%, or at least 80%, of the incident light having the second polarization state and transmits at least 20%, or at least 25%, or at least 30%, of the light having the first polarization state. In some embodiments, for at least one wavelength in the infrared wavelength range, the second reflective polarizer may reflect at least 60% of the incident light having the first polarization state. In some embodiments, the at least one infrared wavelength may include an infrared wavelength emitted by the sun.

In some embodiments, the stacked integral first reflective polarizer and second reflective polarizer may be a single, integral construction. In some embodiments, the first reflective polarizer and second reflective polarizer may be bonded to each other by an optical adhesive layer.

The display and mirror are disposed on a same side of, and generally facing, the stacked first and second reflective polarizers, such that for substantially normally incident light and for the at least one visible wavelength, the mirror reflects at least 80%, or at least 85%, or at least 90%, of the incident light for each of the first and second polarization states, and such that when an image is emitted by the display, the optical system displays a virtual image of the emitted image (e.g., projected onto the windshield of a vehicle), after the emitted image is at least once reflected by the stacked first and second reflective polarizers, for viewing by a viewer (e.g., a passenger or a vehicle, such as the driver).

In some embodiments, at least one of the stacked integral first and second reflective polarizer and the mirror may be curved to provide some amount of optical power to the emitted image. In some embodiments, the curved surfaces may be spherical, aspherical, free-form (i.e., a non-rotationally symmetric surface featuring departures from a best-fit spherical surface), or any appropriate combination thereof. In some embodiments, the use of a free-form surface may provide greater control over the location, number, and size of aberrations in the emitted image projected by the optical system (e.g., improved optical transfer functions from the image on the display to the emitted image). In some embodiments, the first reflective polarizer may be disposed between the second reflective polarizer and the mirror. That is, the first and second reflective polarizers may be stacked such that the first reflective polarizer is facing the mirror.

According to some aspects of the present description, a heads-up display (HUD) may include the optical system and a windshield of a vehicle such that when an image is emitted by the display, the optical system may transmit the emitted image toward the windshield. The windshield may reflect the transmitted image toward the eye of a viewer (e.g., a driver or other passenger) in the vehicle, such that the viewer views a virtual image of the emitted image. In some embodiments, an image may be emitted by the display such that a visible image ray from the emitted image is sequentially reflected by the first reflective polarizer, reflected by the mirror, and then transmitted by the stacked first and second reflective polarizers, onto the windshield of the vehicle or a similar surface, creating a virtual image of the transmitted image display for viewing by the viewer. In some embodiments, a vehicle may include the optical system. In some embodiments, the stacked first and second reflective polarizers may be disposed at or near the dashboard of the vehicle (e.g., on the exit surface of a glare trap mounted in the dashboard).

According to some aspects of the present description, an optical film includes an integral first disposed on an integral second optical stack. In some embodiments, each integral optical stack may include a plurality of polymeric interference layers reflecting and transmitting light primarily by optical interference for at least one visible wavelength in a first wavelength range extending from about 450 nm to about 680 nm (e.g., human-visible spectrum), and at least one infrared wavelength in a second wavelength range extending from about 900 nm to about 1150 nm, such that for substantially normally incident light, and for the at least one visible wavelength, the integral first optical stack reflects at least 70%, or at least 75%, or at least 80%, of the incident light having a first polarization state and transmits at least 70%, or at least 75%, or at least 80%, of the incident light having an orthogonal second polarization state, and the second optical stack transmits at least 70%, or at least 75%, or at least 80%, of the incident light for each of the first and second polarization states. For normally incident light, and for the at least one infrared wavelength, the second optical stack reflects at least 60%, or at least 65%, or at least 70%, of the incident light having the first polarization state and transmits at least 60%, or at least 65%, or at least 70%, of the incident light having the second polarization state.

In some embodiments, the first optical stack may be spaced apart from the second optical stack by one or more spacers. In some embodiments, the spacers may each have an average thickness may be at least 5 times greater than the average thickness of each of the polymeric interference layers in each optical stack. In some embodiments, the optical film may further include an absorbing polarizer disposed on the stacked first and second optical stacks. For substantially normal light and for the at least one visible wavelength, the absorbing polarizer may absorb at least 60%, or at least 65%, or at least 70%, of the incident light having the first polarization state, and transmits at least 60%, or at least 65%, or at least 70%, of the incident light having the second polarization state.

In some embodiments, the optical film may be cut from a longitudinally continuous web, where the y-axis is along a longitudinal down-web direction and the x-axis is along a lateral cross-web direction. In some embodiments, the integral first optical stack may be integrally disposed on the integral second optical stack (e.g., formed as a larger, integral stack). In some embodiments, the integral first optical stack may be non-integrally disposed on the integral second optical stack (e.g., two separate physical stacks disposed on each other).

According to some aspects of the present description, a heads-up display (HUD) for displaying a virtual image to a passenger of a vehicle includes an exit surface through which an image substantially polarized along a first direction exits the heads-up display and a glare trap. The exit surface is configured to be disposed at or near a dashboard of the vehicle. The glare trap (i.e., a surface designed to reject at least a portion of external, incident light) is disposed at the exit surface and configured to reflect at least a portion of ambient light. The glare trap may include a plurality of polymeric interference layers reflecting and transmitting light primarily by optical interference for at least one wavelength (and, in some embodiments, each wavelength) in a visible wavelength range extending from about 450 nm to about 680 nm (e.g., human-visible light), and for at least one wavelength (and, in some embodiments, each wavelength) in an infrared wavelength range extending from about 900 nm to about 1150 nm, such that for substantially normally incident light: for the at least one wavelength in the visible wavelength range, the glare trap transmits at least 70%, or at least 75%, or at least 80%, of the incident light having the first polarization state and reflects at least 70%, or at least 75%, or at least 80%, of the incident light having an orthogonal second polarization state; and for the at least one wavelength in the infrared wavelength range, the glare trap reflects at least 60%, or at least 65%, or at least 70%, of the incident light for each of the first and second polarization states. In some embodiments, the glare trap may include an infrared absorbing dye, allowing the glare trap to absorb at least 20%, or at least 5%, or at least 30%, of incident light having a wavelength from about 800 nm to about 2000 nm (e.g., infrared wavelengths).

Figure 1:
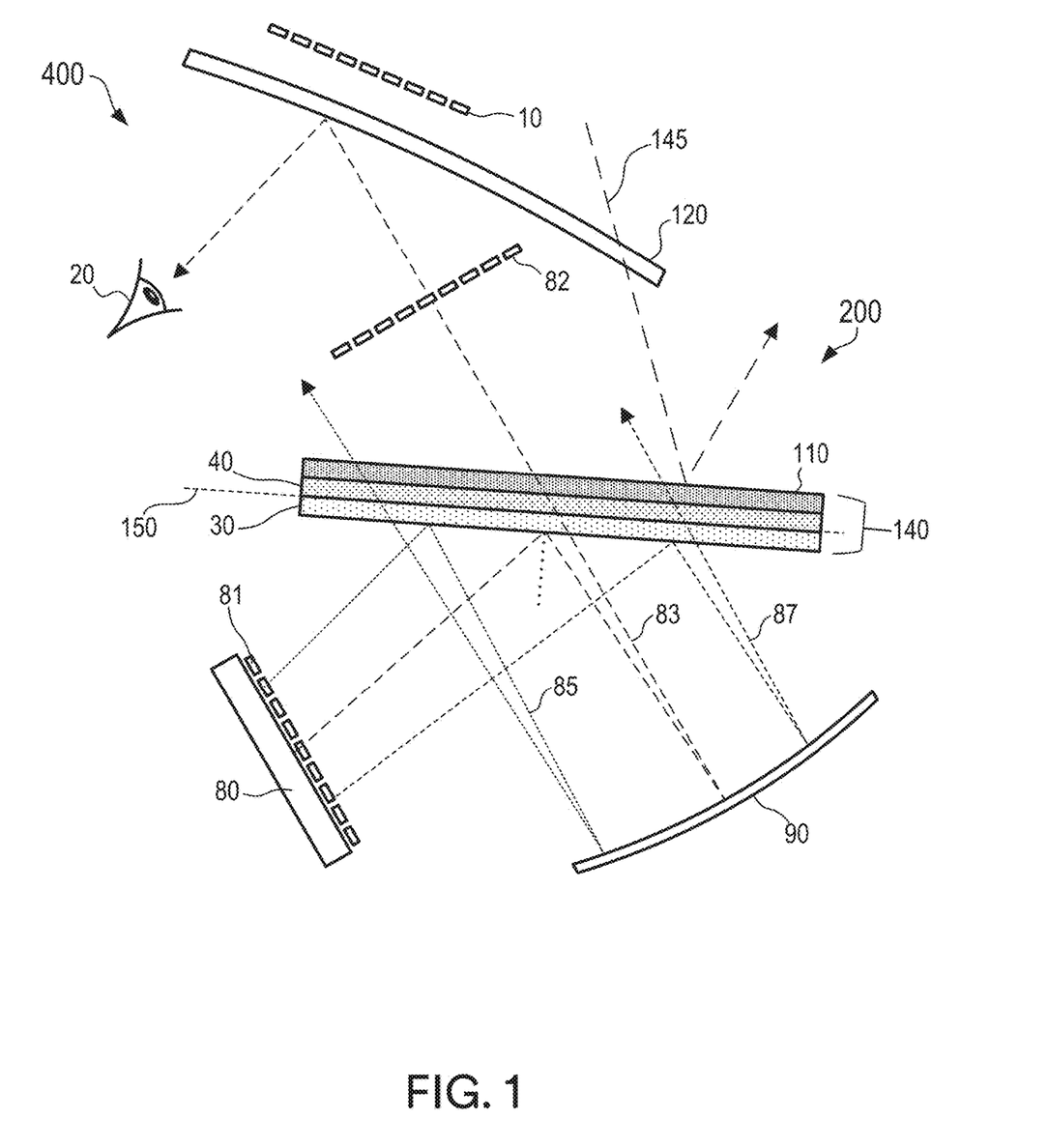
FIG. 1 is a cross-sectional view of an optical system for displaying a virtual image, in accordance with an embodiment of the present description.

Turning now to the figures, FIG. 1 provides a cross-sectional view of an embodiment of a heads-up display (HUD) for displaying a virtual image, according to the present description. HUD 400 includes a display 80, mirror 90, an optical system 200 (e.g., an optical film stack), and a windshield 120. The display 80 (e.g., LED display, LCD display, OLED display, DLP display, EL display, etc.) emits an image 81, which travels along a path defined by representative image rays 83 (representing an image ray emitted at the center of image 81), 85, and 87. Image 81 is first reflected from a surface of optical system 200, then reflected from mirror 90, before passing back through optical system 200 as transmitted image 82. Transmitted image 82 is projected onto windshield 120 and reflected toward the eye of a passenger 20, where it appears as virtual image 10. That is, in some embodiments, the optical path followed by emitted image 81 (as represented by central image ray 83) is configured such that the transmitted image 82 is incident on the eye of passenger 20 in such a way that a virtual image 10 appears to passenger 20 to be projected in the air some distance outside of windshield 120. For the purposes of this disclosure, the term "passenger" shall be interpreted to include any occupant of a vehicle, including a driver. In some embodiments, optical system 200 may be configured to reflect at least a portion of ambient light 145. For example, in some embodiments, optical system 200 may reflect at least a portion of sunlight (e.g., some infrared light wavelengths) incident on the optical system. This may help prevent excessive heat build-up, as well as reducing the number of visible artifacts which may obscure the virtual image 10.

It should be noted that the size of components, angles of reflection, path lengths, and projected image distances shown are not intended to be to scale, and are intended only to convey general concepts.

In some embodiments, optical system 200 may be disposed on an exit surface 150, such as a surface of a vehicle dashboard or on a glare trap for the HUD. In some embodiments, optical system 200 may include optical stack 140, including stacked integral first reflective polarizer 30 and integral second reflective polarizer 40. In some embodiments, optical stack 140 may further include an absorbing polarizer 110 disposed on the stacked integral first reflective polarizer 30 and integral second reflective polarizer 40. In some embodiments, an optical adhesive (not shown in FIG. 1, but discussed elsewhere herein) may be disposed between first reflective polarizer 30 and second reflective polarizer 40. In some embodiments, first reflective polarizer 30 may be disposed closer to mirror 90 than second reflective polarizer 40, as shown in FIG. 1.

In some embodiments, for at least one visible (i.e., human-visible) wavelength in a first wavelength range extending from about 450 nm to about 680 nm, the first reflective polarizer may reflect at least 60% of the incident light having a first polarization state and transmits (i.e., allow to pass through) at least 60% of the incident light having an orthogonal second polarization state. In some embodiments, and for at least one visible wavelength in a first wavelength range extending from about 450 nm to about 680 nm, the second reflective polarizer may transmit (i.e., allow to pass through) at least 60% of the incident light for each of the first and second polarization states.

In some embodiments, for at least one infrared wavelength in a second wavelength range extending from about 900 nm to about 1150 nm, the first reflective polarizer 30 may reflect at least 60% of the incident light having the first polarization state and may transmit at least 60% of the incident light having the second polarization state. In some embodiments, for at least one infrared wavelength in a second wavelength range extending from about 900 nm to about 1150 nm, the second reflective polarizer 40 may reflect at least 60% of the incident light having the second polarization state and transmits at least 20% of the light having the first polarization state.

In some embodiments, the effects of the combined (e.g., stacked) first reflective polarizer 30 and second reflective polarizer 40 may be to allow folding of the optical path (e.g., alternate reflecting and transmission of image rays to reflect the image rays appropriately along an intended optical path) as well as limiting the amount of unwanted light (e.g., ambient light, infrared wavelengths, etc.). In some embodiments, the optical stack 140 may further include absorbing polarizer 110, to increase the optical efficiency of the system in transmitting primarily desired wavelengths of light.

It should be noted that other components may be present in heads-up display 400 which are not shown in FIG. 1. These components may be necessary for the proper operation of the heads-up display 400, but are omitted as they are not pertinent to the present disclosure. For example, in some embodiments, the optical system may also include one or more quarter wave plates, positioned within the system such that the polarization of the emitted and reflected image rays changes appropriately from one state to another as needed to either be transmitted by or reflected by the first reflecting polarizer 30, or other components of optical stack 140.

Figure 2A:
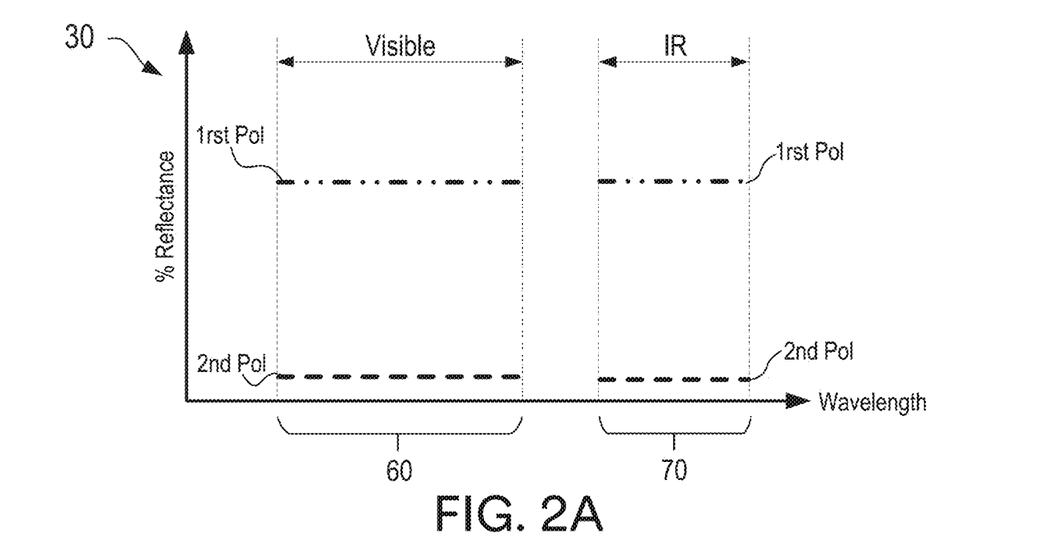
FIGS. 2A-2B provide graphs showing percentage reflectance of various wavelengths for an optical system for displaying a virtual image, in accordance with an embodiment of the present description.
Figure 2B:
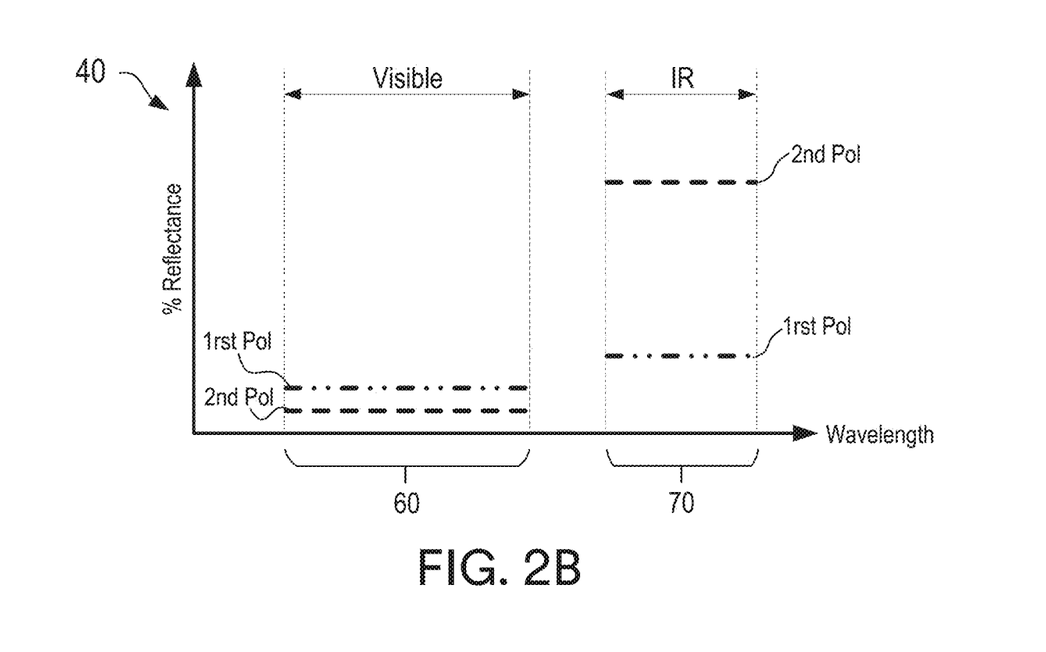

FIGS. 2A and 2B provide graphs showing approximate percentage reflectance of various wavelength ranges for the first and second reflective polarizers, respectively, according to an embodiment described herein. FIG. 2A is the graph showing percentage reflectance for the first reflective polarizer 30, for a first wavelength range 60 (e.g., human-visible wavelengths) and a second wavelength range 70 (e.g., infrared wavelengths). In the first wavelength range 60, first reflective polarizer 30 may reflect at least around 60% or higher of light of the first polarization state, while reflecting only around 15% or less of light of the second polarization state. In the second wavelength range 70 (i.e., infrared wavelengths), first reflective polarizer 30 may reflect at least around 60% or higher of light of the first polarization state, while reflecting only around 15% or less of light of the second polarization state.

FIG. 2B is the graph showing percentage reflectance for the second reflective polarizer 40, for a first wavelength range 60 (e.g., human-visible wavelengths) and a second wavelength range 70 (e.g., infrared wavelengths). In the first wavelength range 60, second reflective polarizer 40 may reflect at least around 20% or less of light of the first polarization state, while reflecting only around 15% or less of light of the second polarization state. In the second wavelength range 70 (i.e., infrared wavelengths), second reflective polarizer 40 may reflect at least around 30% or less of light of the first polarization state, while reflecting around 70% or higher of light of the second polarization state. Combining the effects of the first reflective polarizer 30 and second reflective polarizer 40, as shown in FIGS. 2A and 2B, may largely reduce the transmission of infrared wavelengths in the second wavelength range 70 for both the first and second polarization states. It should be noted that the values shown for percent reflectance in FIGS. 2A and 2B are exemplary only, and should not be construed to be limiting in any way.

Figure 3A:
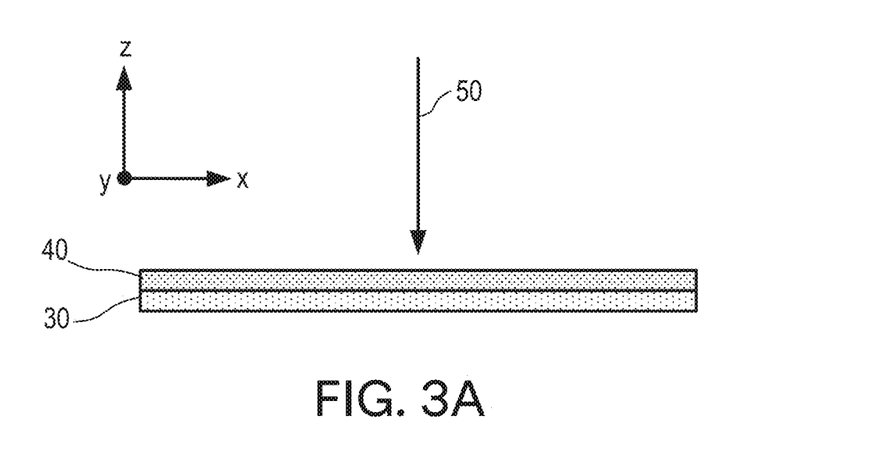
FIGS. 3A-3C are cross-sectional views of layers in an optical system for displaying a virtual image, in accordance with an embodiment of the present description.
Figure 3B:
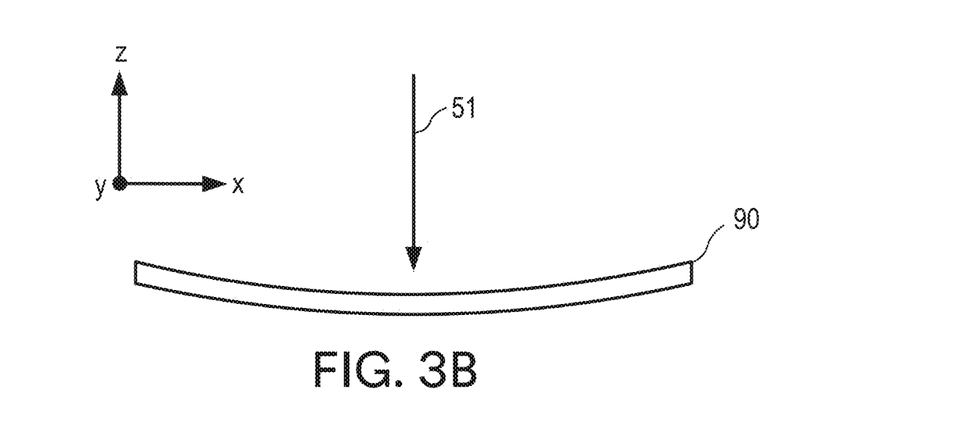
Figure 3C:
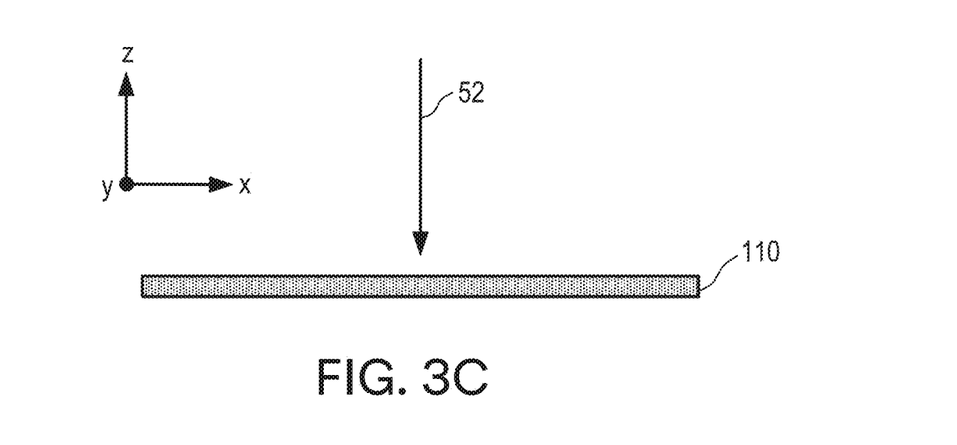

FIGS. 3A-3C are cross-sectional views of layers in an optical system for displaying a virtual image, according to an embodiment of the present description. These figures illustrate what is meant by "normally incident light" as discussed in terms of each of the layers discussed herein. FIG. 3A shows normally incident light 50 in relation to first reflective polarizer 30 and second reflective polarizer 40. FIG. 3B shows normally incident light 51 in relation to mirror 90. In some embodiments, mirror 90 may be curved to provide power (e.g., magnification) of the reflected image rays, as shown in FIG. 3B. In these embodiments, normally incident light 51 is defined as orthogonal to a center point of mirror 90. As any of the components shown in FIGS. 3A-3C may be curved in some embodiments, normally incident light shall be defined relative to incidence on a center point of the components (e.g., the reflective polarizers 30/40 of FIG. 3A, the absorbing polarizer 110 of FIG. 3C). Finally, FIG. 3C shows normally incident light 52 in relation to absorbing polarizer 110.

Figure 4A:
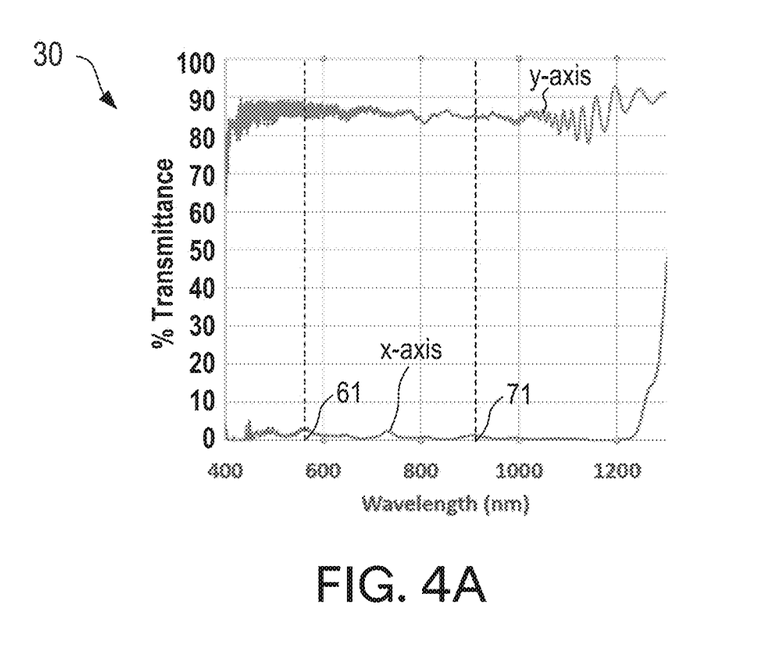
FIG. 4A-4B provide graphs showing percentage transmittance of various wavelengths for layers in an optical system for displaying a virtual image, in accordance with an embodiment of the present description.
Figure 4B:
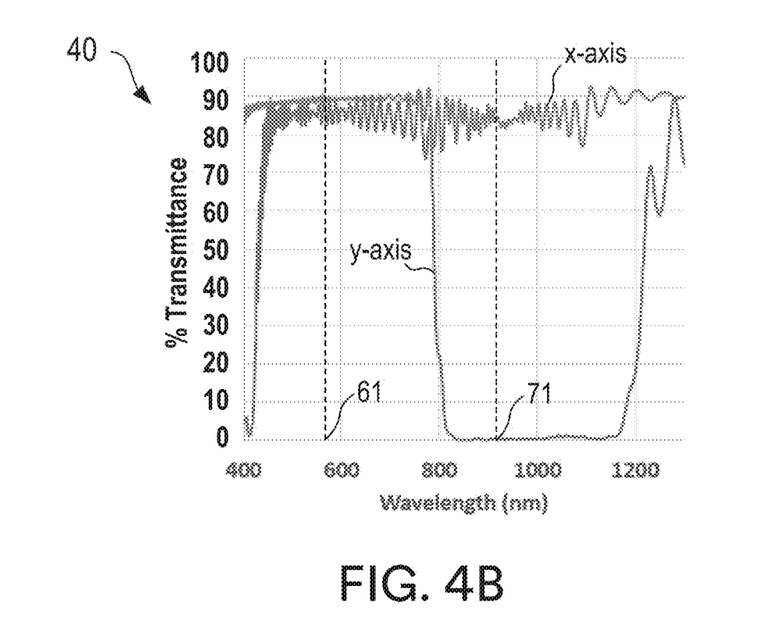
Figure 5:
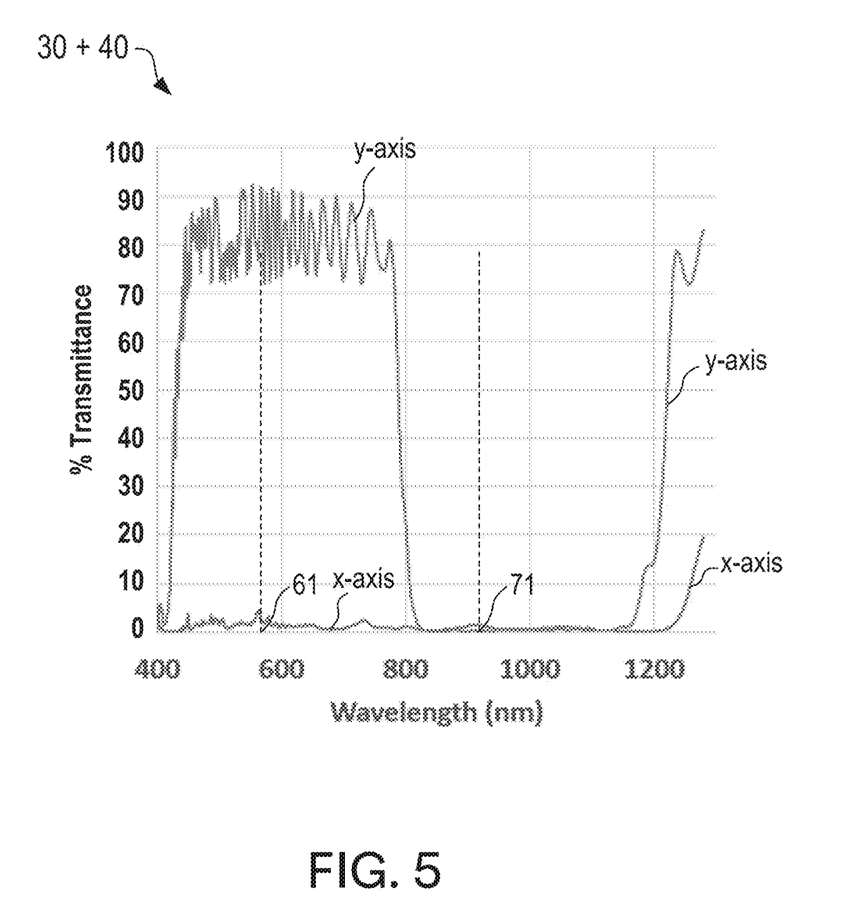
FIG. 5 is a graph showing percentage transmittance of various wavelengths for an assembled optical system for displaying a virtual image, in accordance with an embodiment of the present description.

FIG. 4A-4B provide graphs illustrating percentage transmittance of various wavelengths of light for each of the first 30 and second reflective polarizers 40, according to an embodiment of the present description, and FIG. 5 shows the combined transmission spectra of both reflective polarizers 30/40. FIG. 4A shows the percent transmission of wavelengths for first reflective polarizer 30. FIG. 4A depicts two lines, one representing light polarized in a first polarization state, and the other representing light polarized in a second polarization state. For the purposes of FIGS. 4A-4B and FIG. 5, it is assumed the films are configured such that the x-axis of the film is aligned with the first polarization state, and the y-axis of the film is aligned with the second polarization state. However, alternate embodiments are possible within the scope of this disclosure which use different configurations of the films, with alternate alignments and polarization states.

As can be seen in FIG. 4A, the first reflective polarizer 30 transmits a significant portion (i.e., over 80 percent for much of the plot) of the light polarized to the y-axis of the film (e.g., the second polarization state of light) for both human-visible wavelengths (e.g., about 450 nm to about 680 nm) and infrared wavelengths (e.g., about 900 nm to about 1150 nm). Conversely, the first reflective polarizer 30 reflects (i.e., does not transmit) a significant portion (i.e., over 95 percent for much of the plot) of the light polarized to the x-axis (e.g., the first polarization of light) for both human-visible wavelengths (e.g., about 450 nm to about 680 nm) and infrared wavelengths (e.g., about 900 nm to about 1150 nm). A representative human-visible wavelength 61 and infrared wavelength 71 are shown for illustration purposes.

FIG. 4B shows the percent transmission of wavelengths for second reflective polarizer 40. FIG. 4B also depicts two lines, one representing light polarized in a first polarization state (e.g., polarized to the x-axis), and the other representing light polarized in a second polarization state (e.g., polarized to the y-axis). The second reflective polarizer 40 transmits a significant portion (i.e., over 80 percent for much of the plot) of the light polarized to the y-axis for human-visible wavelengths from about 450 nm to about 680 nm, but reflects (e.g., does not transmit) infrared wavelengths from about 850 nm to about 1150 nm. The second reflective polarizer 40 largely transmits a significant portion (i.e., over 80 percent for much of the plot) of the light polarized to the x-axis for both human-visible wavelengths (e.g., about 450 nm to about 680 nm) and infrared wavelengths (e.g., about 900 nm to about 1150 nm). As with FIG. 4A, representative human-visible wavelength 61 and infrared wavelength 71 are shown for illustration and comparison purposes.

FIG. 5 shows the percent transmittance for an optical stack with both first reflective polarizer 30 and second reflective polarizer 40 included. The combined reflective polarizers 30/40 transmit a significant portion (i.e., over 70 percent for much of the plot) of the light polarized to the y-axis for human-visible wavelengths from about 450 nm to about 680 nm, including representative human-visible wavelength 61, but substantially reflect (e.g., do not transmit) infrared wavelengths from about 850 nm to about 1150 nm, including representative infrared wavelength 71. For light polarized to the x-axis, the combined reflective polarizers 30/40 substantially reflect (e.g., do not transmit) human-visible wavelengths from about 450 nm to about 680 nm and infrared wavelengths from about 850 nm to about 1150 nm.

Figure 6A:
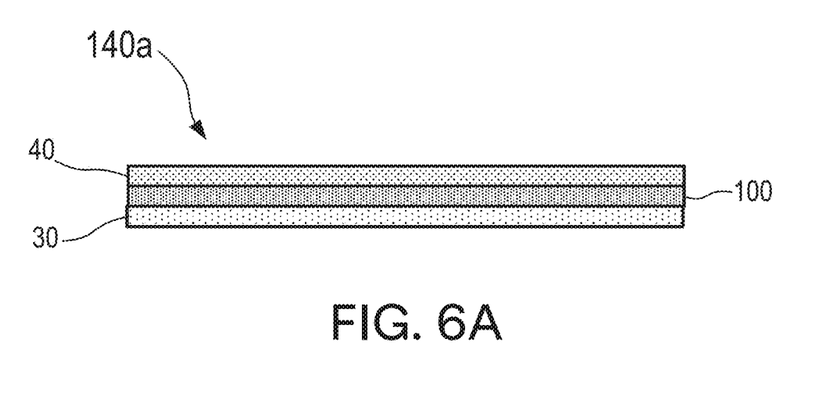
FIGS. 6A-6B show cross-sectional views of layers and their construction for an optical system for displaying a virtual image, in accordance with an embodiment of the present description.
Figure 6B:
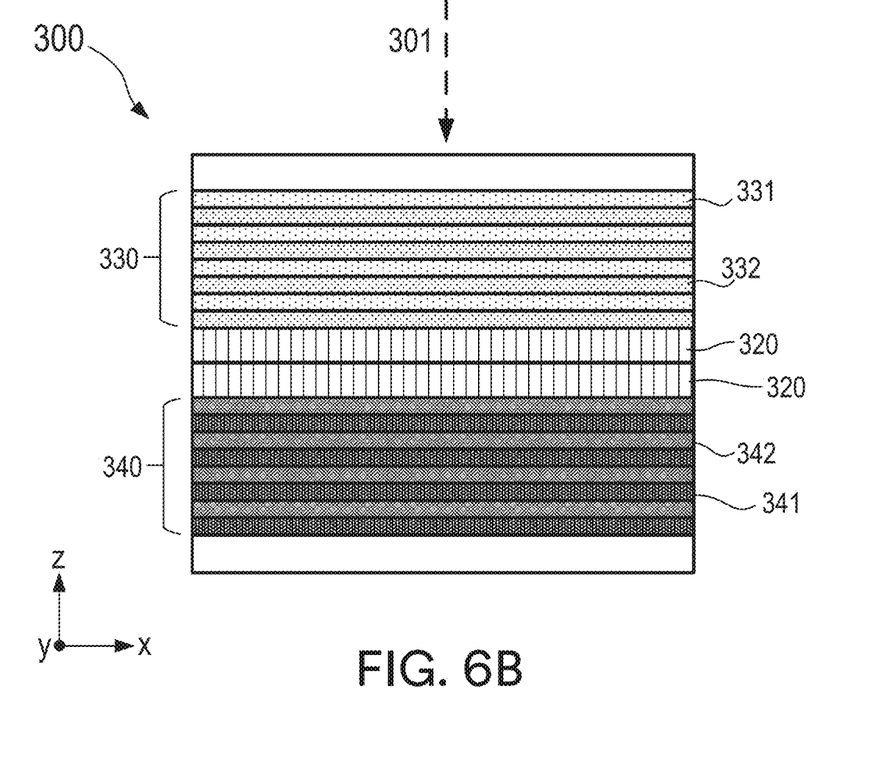

FIGS. 6A-6B show cross-sectional views of an optical stack according to an embodiment of the present disclosure, including additional details on the possible construction of the layers. FIG. 6A illustrates that, in some embodiments, the first reflective polarizer 30 and the second reflective polarizer 40 may be bonded to each other by an optical adhesive layer 100. One example of an optical adhesive layer 100 is a curable acrylate adhesive. However, any appropriate type of optical adhesive layer 100 may be used.

FIG. 6B illustrates an optical film 300 comprising an integral first optical stack 330 disposed on an integral second optical stack 340. In some embodiments, first optical stack 330 may be the first reflective polarizer 30 of FIG. 1, and second optical stack 340 may be the second reflective polarizer 40 of FIG. 1. In some embodiments, integral first optical stack 330 may include a plurality of alternating polymeric interference layers 331 and 332, which reflect and transmit light primarily by optical interference (e.g., alternating layers 331 and 332 may have different indices of refraction), and integral second optical stack 340 may include a plurality of alternating polymeric interference layers 341 and 322, which also reflect and transmit light primarily by optical interference.

For some embodiments, polymeric interference layers 331 and 332 may be configured such that, for at least one visible wavelength in a first wavelength range extending from about 450 nm to about 680 nm (e.g., human-visible wavelengths), and at least one infrared wavelength in a second wavelength range extending from about 900 nm to about 1150 nm (e.g., infrared wavelengths), for substantially normally incident light 301, the integral first optical stack 330 reflects at least 70%, or at least 75%, or at least 80% of the incident light having a first polarization state (x-axis) and transmits at least 70%, or at least 75%, or at least 80% of the incident light having an orthogonal second polarization state (y-axis).

For some embodiments, polymeric interference layers 341 and 342 may be configured such that, for at least one visible wavelength in a first wavelength range extending from about 450 nm to about 680 nm (e.g., human-visible wavelengths), for substantially normally incident light 301, the second optical stack 340 transmits at least 70%, or at least 75%, or at least 80% of the incident light for each of the first and second polarization states, and for the at least one infrared wavelength, the second optical stack 340 reflects at least 60%, or at least 65%, or at least 70% of the incident light having the first polarization state and transmits at least 60%, or at least 65%, or at least 70% of the incident light having the second polarization state.

In some embodiments, first optical stack 330 may be spaced apart from the second optical stack 340 by one or more spacers 320. In some embodiments, the average thickness of each of spacer layers may be at least 5 times greater than the average thickness of each polymeric interference layer (331, 332, 341, 342) in each optical stack 330 and 340.

Figure 7A:
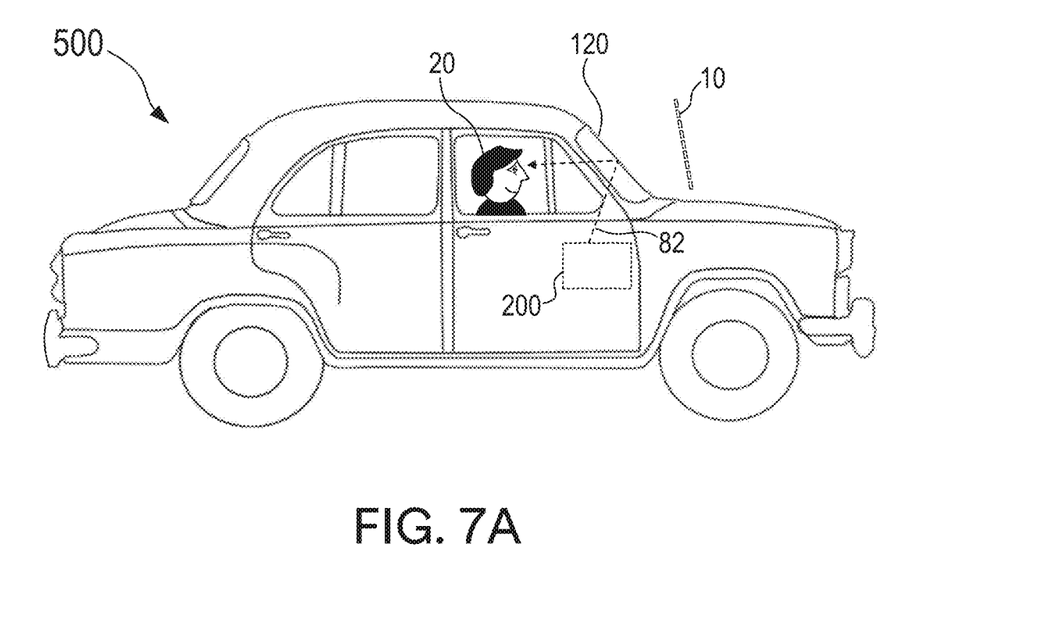
FIGS. 7A-7C show alternate views of an optical system for displaying a virtual image as installed in a vehicle, in accordance with an embodiment of the present description.
Figure 7B:
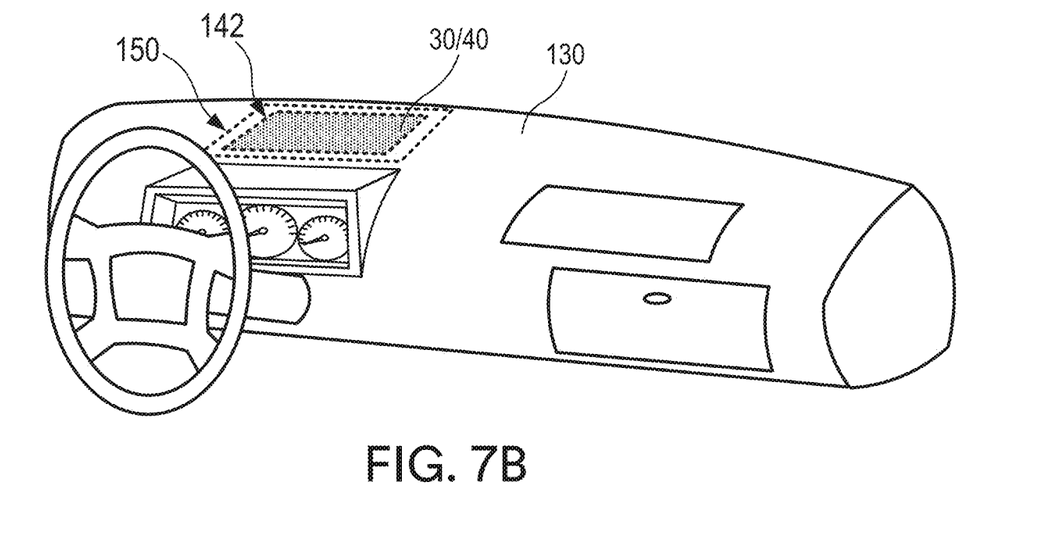
Figure 7C:
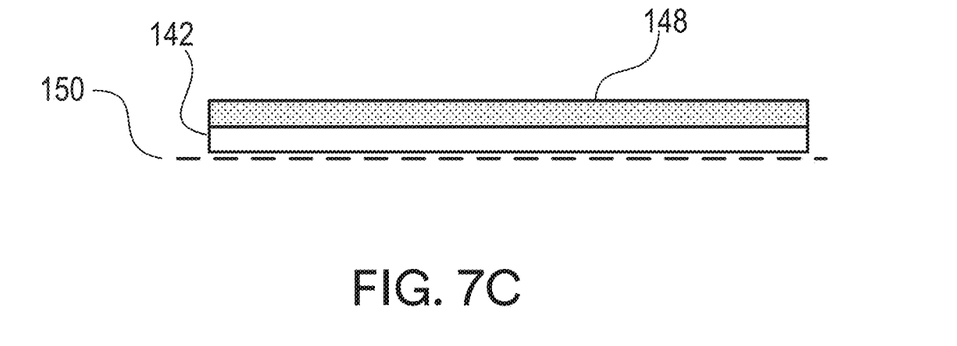

FIGS. 7A-7C show alternate views of an optical system for displaying a virtual image as installed in a vehicle, according to an embodiment of the present description. Turning to FIG. 7A, transmitted image 82 passes through optical system 200 to be reflected from windshield 120 of vehicle 500 into the eyes of passenger 20, creating the perception of virtual image 10 outside of vehicle 500. FIG. 7B shows additional detail of the interior of the vehicle 500 (of FIG. 7A). The first reflective polarizer 30 and second reflective polarizer 40 may be disposed on an exit surface 150 of dashboard 130, for example a glare trap 142. Glare trap 142 may be disposed on the exit surface 150 for a heads-up display, configured to reduce or prevent ambient light (e.g., sunlight) from passing into the heads-up display. FIG. 7C illustrates that, in some embodiments, glare trap 142 on exit surface 150 may further include an infrared absorbing dye 148, such that the glare trap may absorb some portion (e.g., at least 20%) of an incident light having a wavelength from about 800 nm to about 2000 nm, where absorbing dye 148 may be included in a layer designed primarily to absorb light, or added to another layer having other optical properties.

Figure 8:
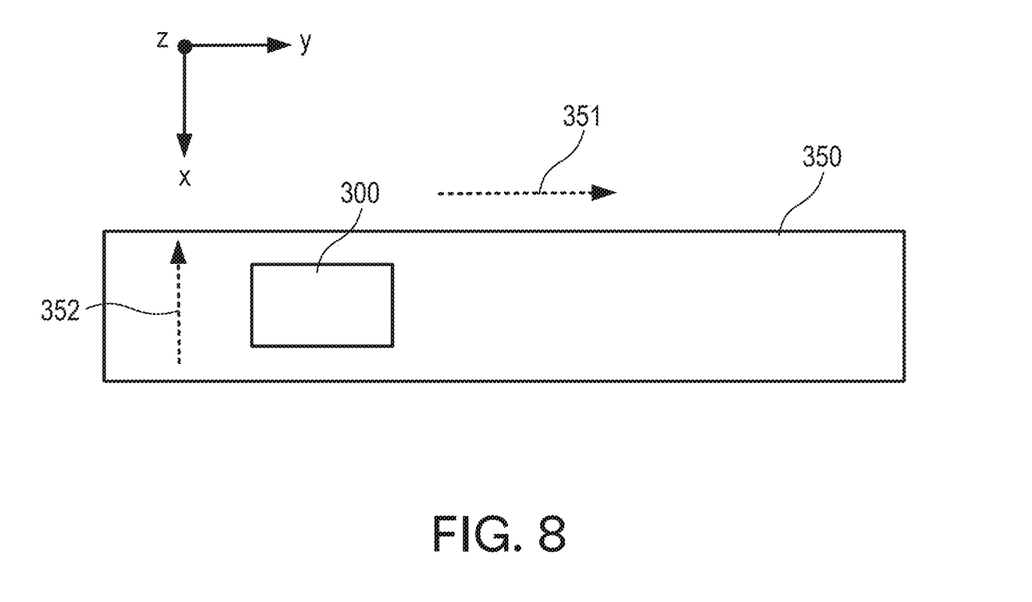
FIG. 8 show an optical film for use in an optical system for displaying a virtual image, as part of a longitudinally continuous web, in accordance with an embodiment of the present description.

Finally, FIG. 8 show an optical film for use in an optical system for displaying a virtual image, as part of a web, according to an embodiment of the present description. In some embodiments, the optical film 300 (see FIG. 6B) may be cut from a longitudinally continuous web 350, wherein the y-axis is along a longitudinal down-web direction 351 and the x-axis is along a lateral cross-web direction 352. The orientation of the optical film 300 in relation to longitudinally continuous web 350 defines the optical properties of the optical film 300 with regard to polarization states of light as discussed herein.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
    an optical stack comprising an absorbing polarizer stacked on a first reflective polarizer; and
    a display and a mirror disposed on a same side of, and generally facing, the optical stack, the first reflective polarizer disposed between the absorbing polarizer and the display and the mirror, the optical system configured to display a virtual image of an image emitted by the display to a viewer after the emitted image is at least once reflected by the optical stack, such that for a substantially normally incident light, a visible wavelength range extending from about 420 nm to about 680 nm, and an infrared wavelength range extending from about 900 nm to about 1150 nm:
    for at least one infrared wavelength in the infrared wavelength range, the first reflective polarizer reflects at least 60% of the incident light having a first polarization state and transmits at least 60% of the incident light having an orthogonal second polarization state; and
    for at least one visible wavelength in the visible wavelength range, the absorbing polarizer absorbs at least 60% of the incident light having the first polarization state and transmits at least 60% of the incident light having the second polarization state.

2. The optical system of claim 1, wherein the at least one visible wavelength comprises one or more of a blue wavelength, a green wavelength, and a red wavelength.

3. The optical system of claim 1, wherein the at least one infrared wavelength comprises at least one infrared wavelength emitted by the sun.

4. The optical system of claim 1, wherein for the substantially normally incident light and the at least one visible wavelength, the first reflective polarizer reflects at least 70% of the incident light having the first polarization state and transmits at least 70% of the incident light having the second polarization state.

5. The optical system of claim 1, wherein the display comprises one or more of a light emitting diode display, an organic light emitting diode display, a liquid crystal display, and an electroluminescent display.

6. The optical system of claim 1, wherein for the substantially normally incident light and for the at least one visible wavelength, the mirror reflects at least 90% of the incident light for each of the first and second polarization states.

* * * * *